May 13, 1952     A. R. THOMPSON     2,596,798
APPARATUS FOR FEEDING AND ORIENTING PEARS
Filed July 19, 1947     5 Sheets-Sheet 4

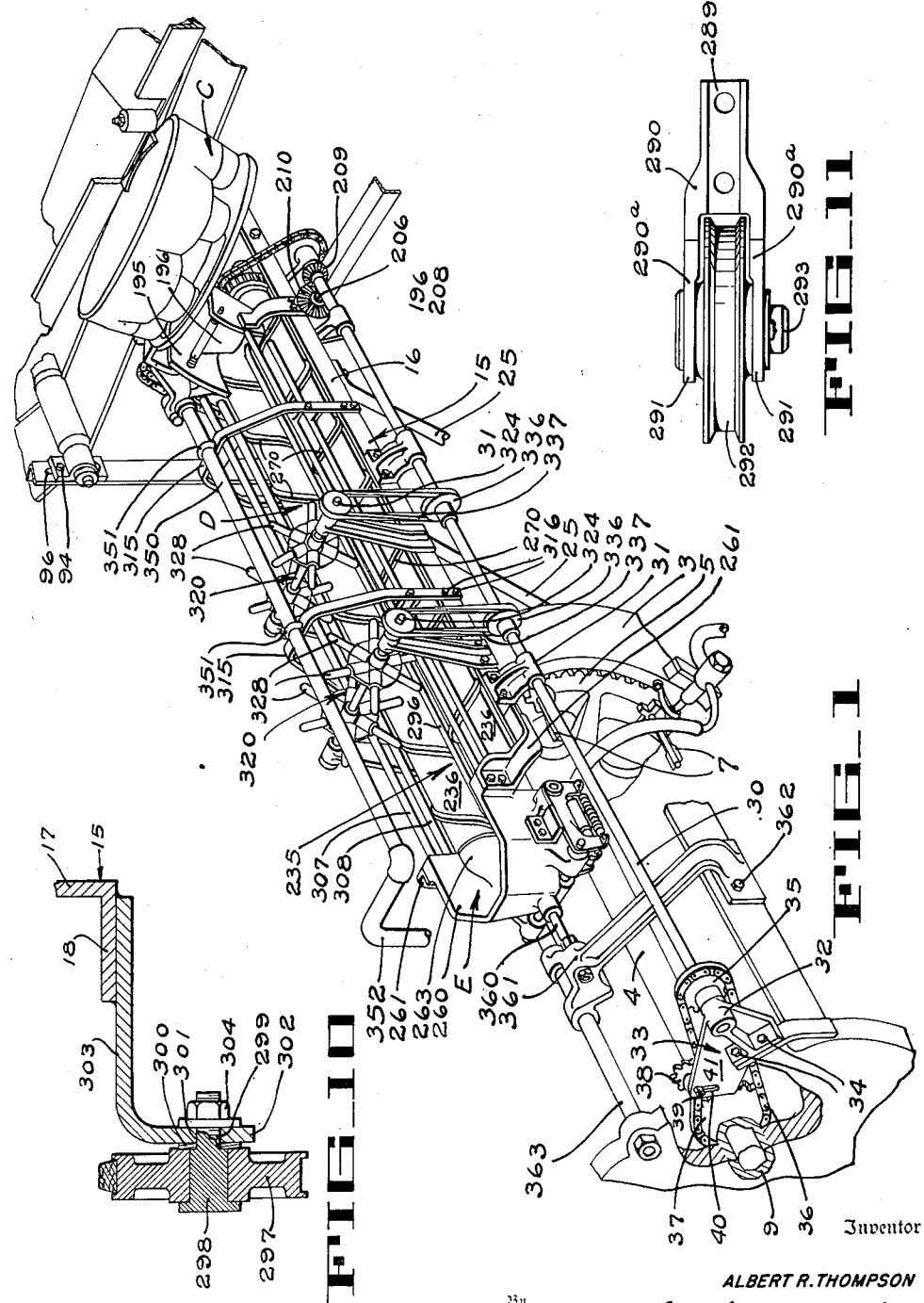

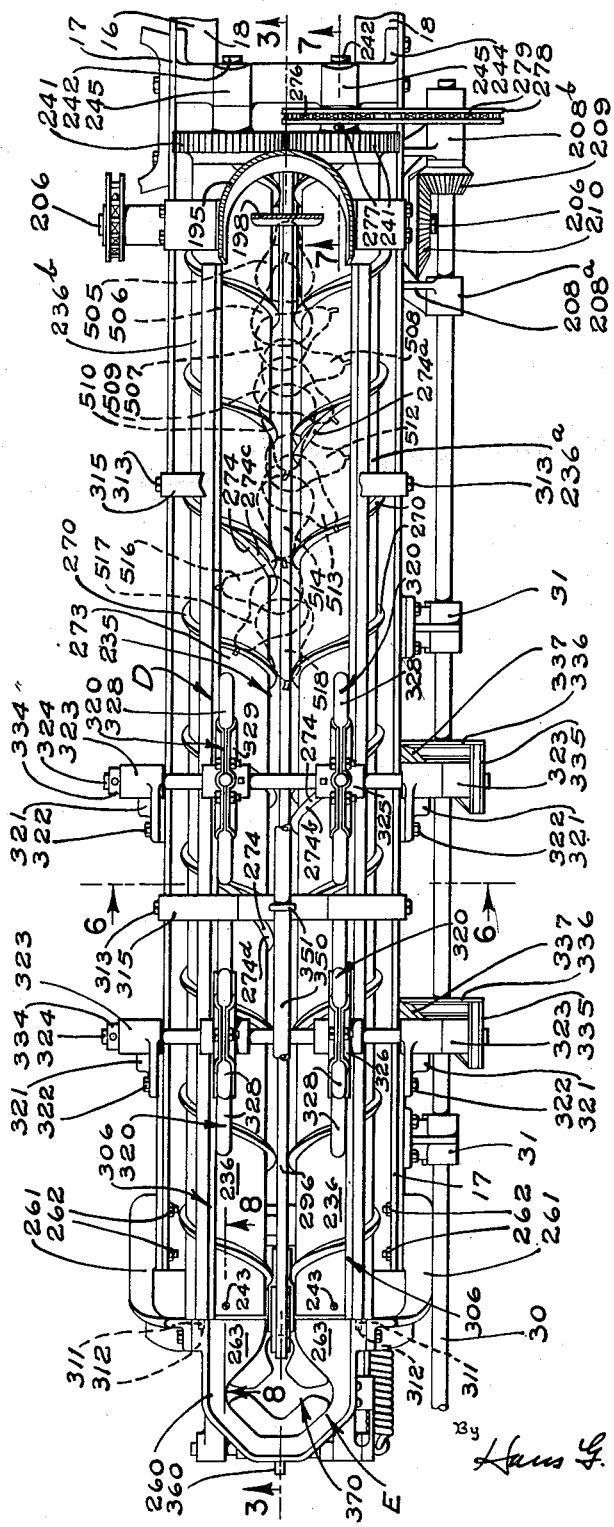

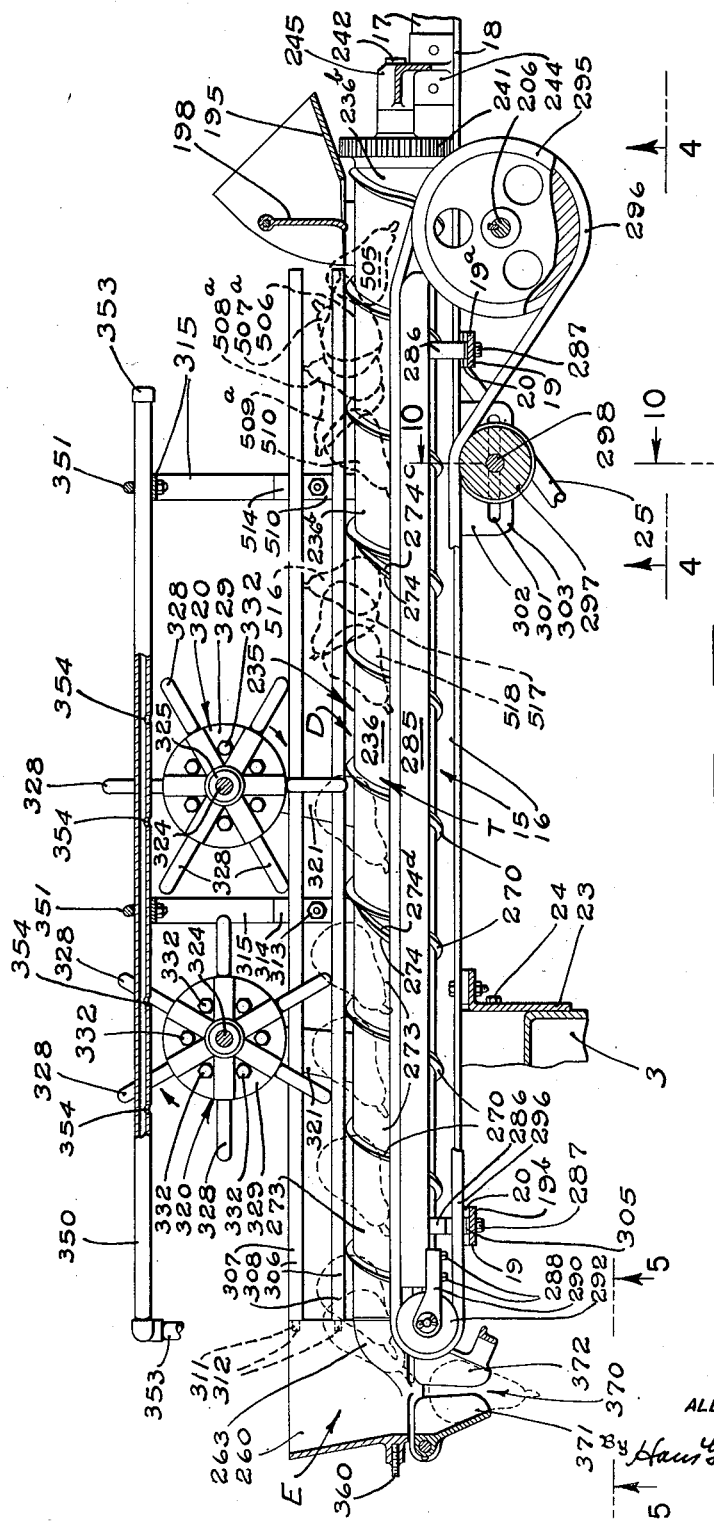

INVENTOR
ALBERT R. THOMPSON

BY Philip A. Minnis
Hans G. Hoffmeister
ATTORNEYS

May 13, 1952 A. R. THOMPSON 2,596,798
APPARATUS FOR FEEDING AND ORIENTING PEARS
Filed July 19, 1947 5 Sheets-Sheet 5
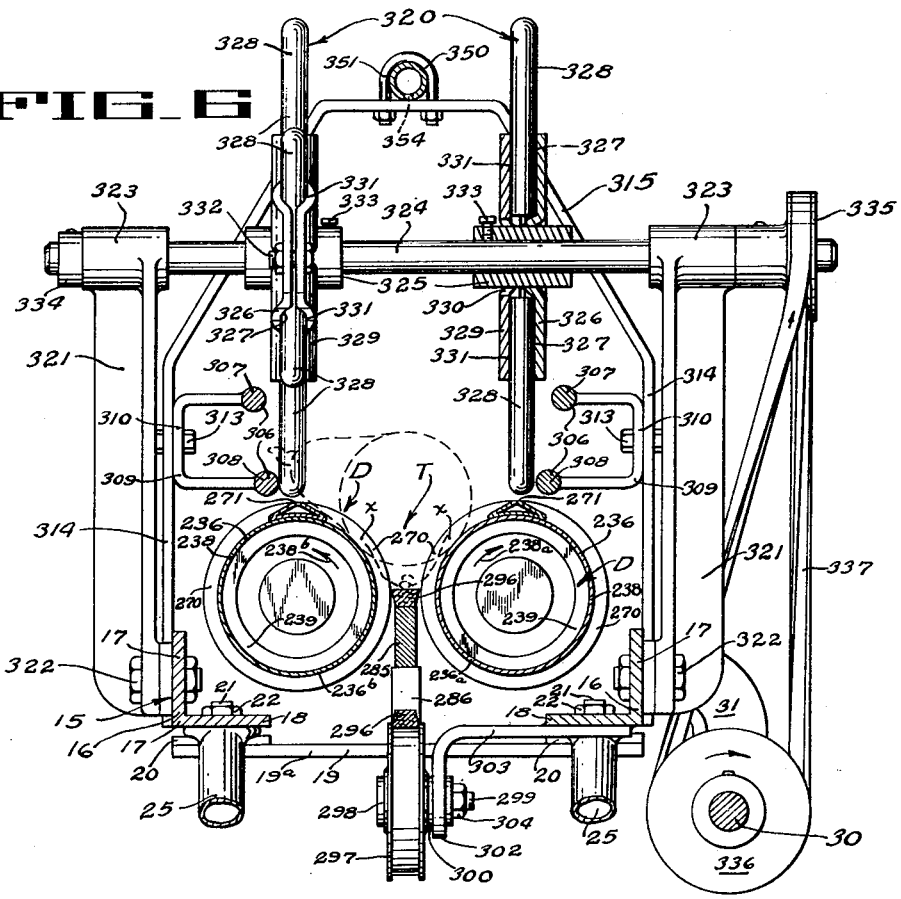
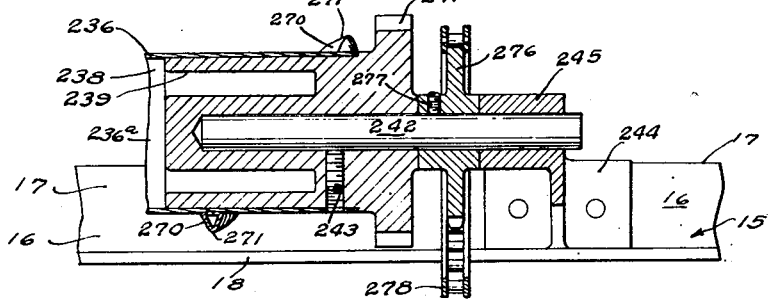
INVENTOR
ALBERT R. THOMPSON
BY
ATTORNEYS Patented May 13, 1952

2,596,798

UNITED STATES PATENT OFFICE 2,596,798

APPARATUS FOR FEEDING AND ORIENTING PEARS

Albert R. Thompson, Los Gatos, Calif., assignor to Food Machinery and Chemical Corporation, a corporation of Delaware Original application January 3, 1945, Serial No. 571,146. Divided and this application July 19, 1947, Serial No. 762,190

26 Claims. (Cl. 198—33)

This invention relates generally to the fruit handling art, and is more specifically concerned with the provision of a new and improved apparatus for feeding and orienting pears to a desired place of reception, such as, for example, to the fruit receiving cups of a pear preparation machine.

This application is a division of my copending application Serial No. 571,146, filed January 3, 1945, and now Patent No. 2,581,732, granted January 8, 1952, for Apparatus for Feeding and Orienting Pears.

An illustrative example of a pear preparation machine with which my invention may be employed is partially disclosed in the copending application of F. H. Luhdorff and myself Serial No. 523,084, filed February 19, 1944, and now Patent No. 2,502,797, granted April 4, 1950, reference being made to my prior Patent No. 2,139,704, dated December 13, 1938, for further details of the machine which were omitted from the drawings of said application for purposes of clarity. Another example of a pear preparation machine with which the present invention may be employed is disclosed in the patent to B. C. Coons No. 2,187,075, dated January 16, 1940.

In the operation of such pear preparation machines it is highly important that the pears be deposited in the feed cups in stem end down position since if otherwise positioned they will not be properly operated upon by the machine and thus result in a loss to the canner. It is also important that the pears be delivered to the feed cups as rapidly as the speed of the preparation machine will permit in order to utilize the full capacity of the machine.

It is the general object of my invention to provide an improved apparatus for orienting and feeding pears to a pear preparation machine or other desired place of reception.

More specifically it is an object to provide such an apparatus which has a large capacity and which is highly effective in delivering the pears in uniform and accurately oriented position.

Various other objects and advantages will become more apparent from the following description taken in connection with the accompanying drawings wherein:

Fig. 1 is a perspective view of the pear feeding and orienting mechanism of the present invention.

Fig. 2 is an enlarged plan view of the feeding and orienting conveyor and the timing and discharge mechanism associated therewith.

Fig. 3 is a longitudinal section of the orienting conveyor taken along line 3—3 of Fig. 2.

Fig. 6 is an enlarged cross section of the feeding conveyor taken along line 6—6 of Fig. 2.

Fig. 7 is an enlarged sectional detail view of a mount for one end of a conveyor roll taken along line 7—7 in Fig. 2.

Fig. 10 is an enlarged section through the center belt tensioning mechanism taken along line 10—10 in Fig. 3.

Fig. 11 is an enlarged plan view of the center belt pulley and bracket therefor at the discharge end of the machine.

Figures 4, 5:
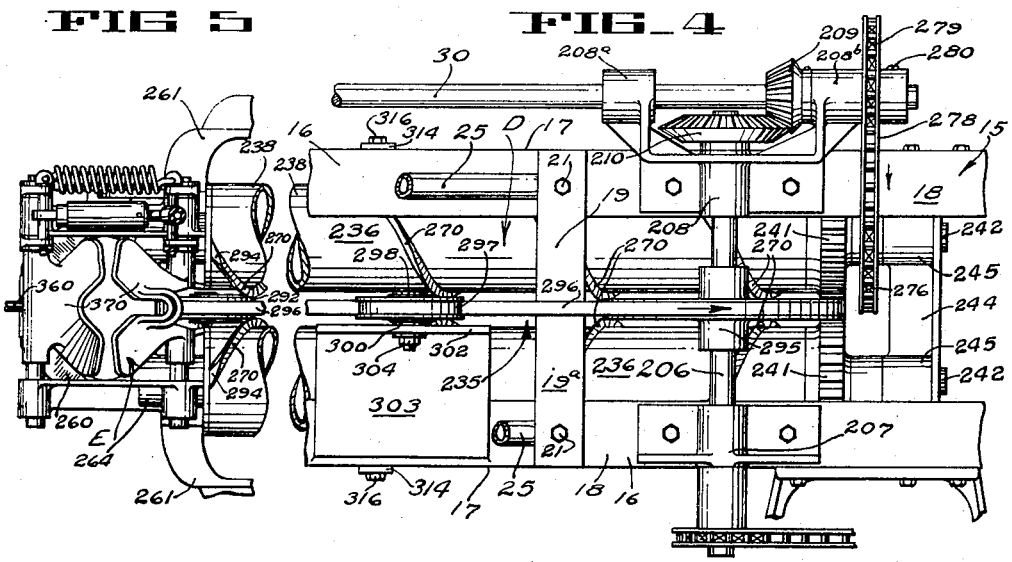
Fig. 4 is a bottom view of the receiving end of the feeding and orienting conveyor as seen from line 4—4 in Fig. 3.
Fig. 5 is a bottom view of the timing and discharge mechanism as seen from line 5—5 in Fig. 3.

For purposes of illustration, the pear feeding and orienting mechanism of the present invention has been shown in connection with a pear preparation machine such as shown in the copending application Serial No. 523,084, above referred to, which has as its foundation a frame structure similar to that of the pear peeler shown and described in United States Letters Patent No. 2,139,704. It should be noted, however, that the feeding and orienting mechanism of the present invention may also be used in connection with other types of machines or to deliver pears to any desired place of reception as will be obvious to those skilled in the art.

Preliminary to a detailed description of the pear feeding and orienting mechanism illustrated, it may be stated briefly that the pear preparation machine with which it is shown associated (Fig. 1) comprises a frame 1 including a turret housing 3 which support for intermittent rotation a turret shaft 4 to which is secured a turret 5 provided with a plurality of stemming tubes 7 upon which pears to be prepared are impaled for intermittent advance as shown and described in Patent No. 2,139,704 hereinbefore mentioned. The shaft 4 is intermittently driven through a Geneva drive (not shown) while a constantly rotating tubular shaft 9 coaxially and rotatably mounted on the shaft 4 is suitably driven by the prime mover of the machine (not shown) as clearly shown in Patent No. 2,139,704 previously referred to herein.

Independent drive means may be employed for driving the pear feeding and orienting mechanism of the present invention. However, since it is intended to operate in synchronism with a pear preparation machine, it is preferably driven directly by the pear preparation machine with which it is associated.

The pear feeding and orienting mechanism comprises a frame structure 15 (Figs. 1, 2, 3, 4 and 6) including a pair of angle irons 16 having the flanges 17 thereof arranged vertically to form upstanding outer edges of the frame and their other flanges 18 arranged horizontally and facing inwardly toward each other. The angles are arranged parallel to each other and are spaced from each other by cross straps 19. Pillow blocks 20 are arranged between the flanges 18 and the ends of the straps 19, and bolts 21 extend through the straps, blocks, and flanges which are secured together tightly by threading a nut 22 upon each bolt. Bolted to the bottom flanges 18 at a point adjacent the pear preparation machine is a bracket 23 which is bolted as at 24 to the turret housing 3, see Fig. 3. The opposite end of the frame structure 15 is braced by struts 25 having their lower ends (not shown) suitably bolted to frame 1 of the pear preparation machine and their upper ends bolted conjointly with the strap 19a to the angles 16.

A drive shaft 30 is rotatably arranged in aligned bearing brackets 31 bolted to the upstanding flanges 17 on one side of the frame 15 and the forward end of this shaft is journaled in a bearing 32 formed on a bracket 33 bolted as at 34 on the frame 1 of the pear preparation machine. Secured to the shaft 30 adjacent the bracket 33 is a sprocket 35 which is drivingly connected by a chain 36 to a sprocket 37 secured to the constantly rotating tubular shaft 9. An idler sprocket 38 is rotatably mounted on a stud shaft 39 extending through a slot 40 in the web portion 41 of the bracket 33 and secured to the web portion at the desired position to tension the chain 36. From the foregoing it is therefore apparent that upon operation of the pear preparation machine, i. e., rotation of the shaft 9, the drive shaft 30 is constantly rotated in timed relation therewith.

The feeding and orienting conveyor D constitutes a screw feed 235 formed by a pair of substantially horizontally disposed spaced conveyor screws 236 extending lengthwise of the frame 15 as shown in Figs. 2 to 6 inclusive.

The screws 236 are supported in spaced relation as shown in Fig. 6 to form a trough T for supporting pears deposited in timed intervals thereon by any appropriate mechanism such as a rotary conveyor C, for orienting them and for conveying the same in oriented condition to a timing and discharge mechanism E.

Figure 8:
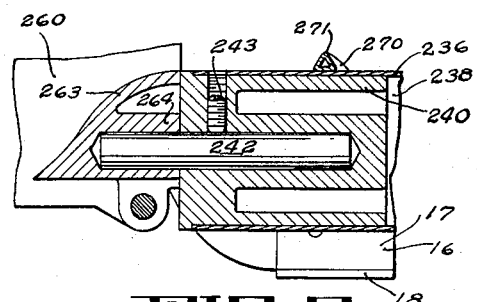
Fig. 8 is an enlarged sectional detail of a mount for the opposite end of the conveyor roll taken along line 8—8 of Fig. 2.

Each screw comprises a tubular section or roll 238 having a sleeve cap 239 pressed into and sweated onto its receiving end, as seen in Fig. 7, and a sleeve cap 240 pressed into and sweated onto its discharge end, as seen in Fig. 8. Each sleeve cap 239 has a spur gear 241 formed thereon and adapted to mesh with each other for rotating the tubular sections in opposite directions. Each of the sleeve caps 239 and 240 has a spindle 242 secured thereto by set screws 243. The spindles 242 of each conveyor screw are axially aligned with the tubular section thereof.

The frame 15 (Figs. 2 and 7) is provided with a bracket 244 bolted adjacent the front end thereof. This bracket has a pair of bushings 245 in which the respective spindles 242 extending from the sleeve caps 239 are rotatably mounted to support the receiving end of the conveyor screws on the frame. The opposite end of the frame is provided with a U-shaped hopper 260 bolted to the upper ends of bracket arms 261, the lower ends of the bracket arms are bolted as at 262 to the ends of the upstanding flanges 17 of the frame 15. This U-shaped hopper 260 is provided with a pair of rounded block formations 263 having bushings 264, Fig. 8, for rotatably supporting the spindle shafts 242 extending from the sleeve caps 240 adjacent the timing and discharge mechanism E. As seen in Figs. 2, 3, 8 and 9, the upper surfaces of these block formations 263 are aligned with the ends of the tubular sections or rolls 238 and are of a contour which molds into the hopper formation so that the block formations cooperate with the side walls of the hopper to guide the pears from a substantially horizontal to a vertical position.

Each of the tubular sections or rolls 238 is provided with a spirally trending thread 270. The threads 270 may be formed integrally with the constituent parts of the conveyor or feed screws 236 as by molding or cutting a thread into stock having substantially the form of the feed screws. However, in forming each screw the spiral thread is preferably applied by winding a helically trending bead 271 about the tubular section 238. This bead may be made from continuous tubing rolled to the form of an isosceles triangle in cross section as seen in Figs. 7 and 8. The base of each helically trending triangular shaped thread is soldered or otherwise secured to the tubular section associated therewith.

Each spiral thread commences at the front or fruit receiving end of its respective tubular section adjacent the spur gear 241 and is wound about the tubular section or roll in equally spaced convolutions to the discharge end of the same to space the pears equally from each other as they are fed along the trough T. The spacing between the convolutions of the thread of each conveyor screw is greater than the length of the largest pears to be handled by the machine.

The spiral threads 270 on the two rolls are oppositely convoluted (Fig. 2) and are so disposed and aligned relative to each other transversely of the trough as to form a plurality of pockets 273 therein traveling from the receiving to the discharge end of the rolls upon rotation thereof in opposite directions, i. e., in the directions as indicated by arrows 238a and 238b in Fig. 6. Each of these pockets is adapted to receive and advance a single pear only and is of sufficient length to accommodate the pear lengthwise therein. The threads of the rolls are convoluted in such a manner that the thread portions in the trough at the rear end of each pocket present a pair of transversely aligned surfaces inclined toward the receiving end of the rolls for engaging the pear in the pocket at transversely opposite points X—X (Fig. 6) in the trough for urging the pear along the same with upward and forward thrusts causing the pear, in conjunction with the action of the rolls thereon, to roll forward and turn endwise, in clockwise or counterclockwise direction, during its travel until its stem end is disposed in leading position in the pocket and is advanced in this position along the trough toward the discharge end of the same.

From the above it will, therefore, be seen that the pears haphazardly dropped upon the screws at the receiving end thereof, with a single pear disposed in each pocket, are advanced in a single file and in spaced relation toward the discharge end of the screws and are oriented incident to their travel along the trough.

The altitude of the triangular shaped tubing or bead 271 is sufficiently high to prevent a fall-back of the pears into the next successive pocket thereby assuring against the possibility of a pocket becoming unoccupied prior to its arrival at the timing and discharge mechanism E or the possibility of a pocket arriving thereat with two pears for a single discharge.

At alternate points along the trough the spiral threads 270 are provided with accelerated lead portions 274 disposed in staggered relation with respect to each other. These lead portions branch out from the normal thread at an increased pitch relative thereto. The first of such lead portions to be encountered by an advancing pear preferably branches from the spiral thread on one screw at about its second convolution from the receiving end of the trough while the next or alternate lead portion branches from the spiral thread on the opposite screw at approximately the third or next successive convolution from the receiving end of the trough. Another such set of lead portions is formed on the screw feed approximately midway between the ends of the trough.

As the screws rotate upwardly and outwardly relative to the trough, the lead portions 274 sweep from below against the bulb portion of the pears with an accelerated action as compared with the normal pitch of the threads 270 by reason of the fact that the lead portions are arranged at an increased pitch with respect thereto.

By this arrangement pears deposited upon the conveyor screws 236 by the conveyor C and advanced along the trough with their stem blossom axes remaining laterally disposed relative to the trough are subjected to a sudden upward and forward thrust or kick at one side thereof by reason of the accelerated advance of the lead portions 274 engaging one side of the bulb portion of the pears. Referring to Fig. 2 the thrust effected by the first lead portion 274a of one of the screws 236a will tend to swing a pear clockwise in the manner as illustrated in sequence by the pears shown in dotted lines at 512 to 514 in Fig. 2, while the thrust of the second lead portion 274c will tend to swing a pear counterclockwise as is illustrated in sequence by the pears shown in dotted lines at 516 and 518 in Fig. 3. Consequently, dependent upon the directional disposition of the pears, those with their neck end portions lying on the feed screw 236a will be swung clockwise while those with their neck ends lying on the opposite screw 236b will be swung counterclockwise whereby the neck ends of such pears are swung forwardly into leading position in the trough T formed by the two screws. The alternate lead portions 274b and 274d further down the trough will have the same effect on any pear that might be disposed to receive an accelerated thrust from them in the same manner as described with respect to the first pair of lead portions.

It is obvious that the same result may be obtained by increasing the pitch of the spiral threads 270 at alternate points along the trough so that certain convolutions of the thread portions are offset relative to each other transversely of the trough at desired points therealong whereby the pears are swung sidewise in one or the opposite direction in the same manner and for the same purpose as explained above regarding the lead portions 274.

As best seen in Figs. 2 and 7, the spindle shaft 242 at the receiving end of the trough and adjacent the drive shaft 30 has a sprocket 276 secured thereto by a set screw 277. A chain 278 is trained around the sprocket 276 and a sprocket 279, secured by set screw 280 to the adjacent end of the drive shaft 30, to rotate the screw 236a in an upward and outward direction relative to the trough as indicated by arrow 238a in Fig. 6 and, consequently, through spur gears 241, to rotate the other screw 236b in an opposite direction, i. e., in the direction indicated by arrow 238b in Fig. 6. The speed of rotation of the twin screws 236 is thereby synchronized with the operation of the pear preparation machine so as to rotate the screws one revolution incident to each intermittent operation of the Geneva drive to feed one pear into the timing and discharge mechanism E upon each intermittent operation of the turret 5. Since both the screw feed and the transfer conveyor are driven from the common drive shaft 30 in synchronism with the intermittent operation of the turret 5, it is apparent that they are in synchronism with each other so that one pear is discharged through the discharge opening 194 upon each revolution of the screw feed 235 when the first pocket 273 thereof is in fruit receiving position beneath the chute 195.

Figure 9:
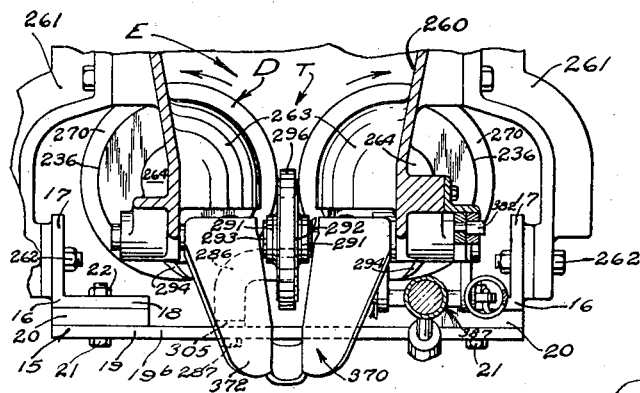
Fig. 9 is a transverse section through the timing and discharge mechanism taken along line 9—9 of Fig. 2.

A center rail 285 is arranged in the space between the two screws 236 on legs 286 resting on the cross straps 19 and secured thereto by bolts 287 as seen in Fig. 3. Secured to the discharge end of the center rail by bolts 288 is a channel shaped end 289 of a yoke 290, also shown in Fig. 11. The spaced arms of the yoke 290 are provided with aligned bearings 291 between which a discharge pulley 292 is disposed for rotation on a shaft 293 suitably journaled in the bearings 291. The upper edges 290a of the spaced arms of yoke 290 are disposed at an angle relative to horizontal and as seen in Figs. 5 and 9 the spiral threads 270 have their discharge ends tapered off at an angle as at 294 to extend substantially parallel to the upper edges of the respective yoke arms when the tapered ends 294 are disposed adjacent the same, the yoke 290 being so disposed relative to the screws 236a and 236b to provide a sufficient clearance between the upper edges 290a of the yoke arms and the tapered ends 294 of the threads to permit free rotation of the screws.

A cross shaft 206 (Figs. 1, 2 and 4) is rotatably mounted on a pair of bearing brackets 207 and 208 bolted to respective angles on each side of the frame 15. The bracket 208 has a pair of spaced bearings 208a and 208b formed thereon for supporting the drive shaft 30 hereinbefore referred to. A bevel gear 209 is secured to the drive shaft 30 and meshes with a bevel gear 210 secured to the cross shaft 206 to rotate the latter counterclockwise as seen in Fig. 3.

A drive pulley 295 is keyed to the cross shaft 206, for rotation in a plane substantially aligned with the center rail 285. Trained around the two pulleys 292 and 295 is a center belt 296 having its upper reach extending from the upper periphery of the drive pulley 295 to ride along the top surface of the center rail 285 and around the discharge pulley 292. The lower reach of the belt 296 is trained through a passage formed by the offset leg 286 on the cross strap 19b and over the bracket 23 as well as over a tensioning pulley 297 and thence around the drive pulley 295.

The tensioning pulley 297, Figs. 3, 6 and 10, is rotatably arranged on a headed stud shaft 298 having a reduced portion 299 on which is arranged a washer 300. The reduced portion is threaded and extends through a horizontal slot 301, formed in the depending flange 302 of a bracket 303 welded to the adjacent flange 18 of the frame 15. A nut 304 is threaded on the reduced portion 299 to secure the stud shaft 298 and pulley 297 in a proper position to tension the belt 296.

The upper reach of the center belt 296 is supported by the center rail 285 at such an elevation relative to the spaced screws 236 as to engage the stem or the neck portion of a pear disposed lengthwise within the trough and the center rail may be raised or lowered, as desired, by applying or removing washers 305 from the bolts 287 between the straps 19 and legs 286 as will be obvious to those skilled in the art.

The drive pulley 295 is so dimensioned as to drive the center belt at a greater speed than the normal rate of advance of the pears by the screw feed so as to produce a constant forward drag on the leading stem ends of pears and prevent detention thereof at any point along the trough sufficiently long to form a fulcrum since, otherwise, the bulb portion of a pear may swing over the stem end thereof.

Each side of the trough T is provided with a side rail 306 each comprising a pair of parallel rods 307 and 308 supported in spaced relation on the ends of lower and upper legs, respectively, by laterally disposed U-shaped brackets 309. The upper legs of the brackets 309 are shorter than the lower legs thereof to dispose the lower rods 308 further away from the bight portions 310 of the brackets than the upper rods 307. The ends 311 of the rods 307 and 308 adjacent the timing and discharge mechanism E are reduced to fit into sockets 312 formed in the abutting face of the aforementioned U-shaped hopper 260 as seen in dotted lines in Figs. 2 and 3. The bight portions 310 of the brackets 309 are secured by bolts 313 to vertical legs 314 of overhead bows 315 bolted as at 316 to the side flanges 17 of the frame 15. As seen in Fig. 6, the rails 306 are flared upwardly and outwardly from the point outside the longitudinal axes of adjacent screws 236 to prevent pears from hopping out of the trough and are open by reason of the space between the rods so as to permit the stems of pears to swing freely between them without binding or catching of the neck portions of the pears thereon.

The discharge half of the trough is provided with two pairs of pear engaging star wheels generally indicated by reference numeral 320 which are employed for the purpose of assuring that all pears, upon arriving at the discharge end of the twin screws, will be discharged therefrom stem end first.

All of the star wheels and their associated parts are identical as seen in Figs. 2, 3 and 6, and, therefore, like reference numerals, will indicate like parts thereof. The support for each pair or set of star wheels comprises a pair of brackets 321 secured by bolts 322 to the outside flanges 17 of the frame 15. Each pair of brackets have aligned bearings 323 at their upper ends for rotatably supporting a cross shaft 324 above the trough. Two star wheels are arranged in spaced relation adjacent each other and are secured to each cross shaft for rotation therewith. Each wheel consists of a hub 325 having a disc portion 326 formed concentric relative to the hub. A series of equally spaced semi-tubular radially extending recesses 327 are formed on the disc 326 to receive a series of rods or flexible rubber fingers 328 radially disposed with respect to the hub portion 325.

A complementary disc 329 having a central opening 330 to fit over the hub 325 has a series of corresponding semi-tubular recesses 331 to embrace the rods 328. The disc 329 is secured to the disc 326 by bolts 332 to grip the rods in vise-like fashion. Each star wheel is so disposed on its respective cross shaft 324 that it rotates in a plane substantially above the longitudinal axis of a respective feed screw 236 and is secured to the cross shaft by a set screw 333 in the hub portion 325.

One end of the cross shaft 324 has a retaining collar 334 secured thereto outside the adjacent bearing 323 while the opposite end of the cross shaft extends beyond the opposite bearing 323 and has a pulley 335 secured thereto. A drive pulley 336 is secured to the drive shaft 38 adjacent the star wheel bracket 321 and trained around this pulley and the pulley 335 is a V-belt 337 whereby to rotate the star wheels in timed relation to the advance of pears by the screw feed 235 in a direction such that the radial rods 328 swing substantially in the direction of movement of the pears along the sides of the trough but at a slightly greater speed relative thereto.

By the foregoing arrangement, the neck portion of any pears arriving laterally disposed in the discharge half of the trough, i. e., with their neck portions lying against one or the other conveyor screw and their stem ends extending laterally from the trough, will be engaged by the rods 328 and kicked forward whereby the pear is turned endwise until its stem end is disposed in leading position in the trough.

A conduit 350 is supported above the trough on the bight portions of the bows 315 hereinbefore mentioned and is secured to these bight portions in alignment with the longitudinal axis of the trough by U-bolts 351. One end of this conduit is connected to a water supply pipe 352 having a suitable control valve (not shown) and its opposite end is closed by a cap 353. The conduit has a series of apertures 354 formed along its bottom surface for spraying water upon the rolls and the pears moving therealong to wash away any juices exuding from the pears and to reduce the friction between the rolls and pears to a minimum.

The timing and discharge mechanism E is carried by the U-shaped hopper 260 at the discharge end of the feeding and orienting conveyor D. This U-shaped hopper (Fig. 1) has its bight portion secured to a brace rod 360 extending from and rigidly supported by a bracket 361 having its lower end bolted as at 362 to the frame 1 of the pear preparation machine and its upper end secured to a tie rod 363 thereof to align the hopper vertically above the oscillating feed cup, not shown, but constituting a part of the pear feed or transfer mechanism described and shown in the aforementioned copending application Serial No. 523,084.

The timing and discharge mechanism E comprises an open ended frusto conical pear positioning and centering pocket or feed trap 370 (Figs. 2, 3 and 9) formed by a pair of cooperating jaws 371 and 372 pivotally mounted on the U-shaped hopper 260. The jaws 371 and 372 are normally held in closed position to receive each pear stem end first from the feeding and orienting conveyor D and are actuated to subsequently discharge the pear stem end down therefrom into and in timed relation with the fruit holding means of a pear preparation machine or other fruit handling apparatus in connection with which the present invention is employed.

*Operation*

The pears to be oriented and fed by the machine of the present invention are separately deposited in timed intervals upon the declined discharge chute 195 by any appropriate mechanism such as for instance, the rotary conveyor C shown and described in my copending application Serial No. 571,146 above referred to. The chute 195 in turn discharges each pear past a flap 198 directly upon the receiving end of the feed screws 236 and into the first traveling pocket 273 formed by the threads thereof. The flap 198 reduces the momentum of the pear sufficiently to prevent it from rolling into the preceding pocket 273. It should be further noted that the continuous rotation of the feed screws in opposite directions, i. e., in the directions as indicated by arrows 238a and 238b, respectively, is timed in such a manner with respect to the operation to the conveyor C that only one pear is deposited into each traveling pocket 273 of the feed screws at the time it is in fruit receiving position beneath the discharge chute 195. The pears successively deposited into successive pockets 273 traveling from the receiving to the discharge end of the trough T are advanced along the trough T by the spirally trending and oppositely convoluted threads 270 of the feed screws in a single file in predetermined spaced relation with respect to each other and in timed relation with respect to the operation of the discharge mechanism E.

The pairs deposited upon the feed screws 236 may be disposed with their stem blossom axes in almost any angular direction and, consequently, will begin their travel along the trough T in different positions relative thereto and it is the function of the feed and orienting conveyor D to orient the pears during their conveyance in such a manner that when the pears arrive at the timing or discharge station E they are all arranged in a predetermined manner with their stem ends disposed in leading position and with the stem end or neck portions of the fruit in contact with the center belt 296 while the bulb portions of the pears are disposed in trailing position within the trough T so that they rest on and between adjacent conveyor rolls 236 and are engaged by the threads 270 of the same at points X—X (Fig. 6) transversely of the trough.

It is, therefore, apparent that pears dropped onto the feed screws 236 and into the traveling pockets 273 thereof with their stem ends disposed in leading position and with their bulb ends resting on and between the tubular portions of adjacent conveyor screws will remain in this position by the reason of the constant forward drag of the center belt 296 on their stem portions, which prevents turning of the pears by the threads of the screws, and will be advanced in this position along the trough toward the discharge end thereof by the spirally trending threads 270 which engage the bulb portion of the pears at opposite points X—X during the continuous rotation of the feed screws 236 and exert a forward thrust against the same.

Pears deposited on the feed screws with their stem ends disposed in trailing position, as shown in dotted lines at 505 in Figs. 2 and 3, are oriented by the combined action of the tubular portions and threads of the feed screws in the manner as illustrated in sequence by the pears shown in dotted lines at 506 to 510 in Figs. 2 and 3.

The neck portion of such pears is engaged and lifted upwardly by the rearwardly inclined and upwardly moving threads 270 of the feed screws 236 at the trailing end of the pocket within which they are disposed as shown at 506. While the neck end of the pears is lifted upwardly the same drops sidewise either against the conveyor screw 236a, as shown at 507 in Fig. 2, or against the conveyor screw 236b, as shown at 507a in Fig. 3.

When the pear arrives at the position, as shown at 507 in Fig. 2, the threads of both conveyor screws 236 engage the bulb end of the fruit and tend to lift the same thereby causing rolling advancement of the bulb end of the fruit along the trough from position 507 to position 509 (Fig. 2). In view of this rolling advancement of the bulb portion, the neck end of the fruit is caused to roll along the tubular portion of the conveyor screw 236a and is swung laterally around in clockwise direction from position 507 to position 508 and finally to position 509 whereupon it slides downward along the tubular portion of the conveyor screw 236a into the trough until it contacts the center belt 296 and is disposed in leading position in the trough T, as shown at 510 in Fig. 2.

If the neck end of the pear drops against the feed screw 236b, as shown in 507a in Fig. 3, it is oriented in substantially the same manner as described in the above with the exception that in this case the neck end of the pear rolls along the tubular portion of the conveyor screw 236b and is swung around in counterclockwise direction from position 507a (Fig. 3) to position 508a and 509a until the neck end slides downwardly the tubular portion of the feed screw 236b and is disposed in leading position upon the center belt 296, as shown at 510 in Fig. 3.

Sometimes, however, if a perfectly symmetrical pear is deposited upon the feed screws with its stem end in trailing position, the neck end of the pear may not drop sidewise against the tubular portion of one or the other feed screw as it is lifted upwardly by the threads 270, but may be swung directly over the bulb portion into leading position in the trough during the rolling advancement of the fruit.

In either case, however, the rotation or rolling of the fruit is immediately arrested as soon as the leading stem end of the fruit contacts the center belt 296 which, since it travels faster than the advancing fruit, exerts a forward drag on the stem end thereof and thereby maintains the fruit with its stem end in leading position, as shown at 510 in Figs. 2 and 3, during further conveyance of the fruit by the threads 270 toward the discharge end of the trough.

If a pear is deposited into the trough T with the stem blossom axis disposed transversely thereof and with its neck portion lying either on the tubular portion of the feed screw 236a, as shown in dotted lines at 508 in Fig. 2, or on the tubular portion of the feed screw 236b, as shown in dotted lines at 508a in Fig. 3, the advancing rearwardly inclined and upwardly and outwardly revolving threads 270 of the opposing screws will roll the bulb portion of the pear along the trough whereby the neck portion of the pear is rolled along the tubular portion of the feed screw against which it is resting and is swung forward, as shown at 509 and 509a, respectively, so that it slides down the tubular portion of the feed screw 236a or 236b into leading position in the trough and into contact with the center belt 296, as shown at 510 in Figs. 2 and 3.

Some pears, however, especially if they have a flat calyx portion, may not be turned around during their advancement by the normal threads 270 of the conveyor screws in the manner as above described, but will remain transversely disposed in the trough either in a position as shown in dotted lines at 508 in Fig. 2 or in a position as shown in dotted lines at 508a in Fig. 3 since the flat calyx portion resting against the tubular portion of one or the other conveyor screw 236b or 236a, respectively, holds the pears in a comparatively stable position so that they will not turn in the manner as above described. These pears are therefore advanced in this position by the threads 270 until their bulb portion is engaged by one of the accelerated or lead portions 274 of the conveyor screw against which their neck end is leaning.

For instance, if a pear remains in the position as shown at 508 in Fig. 2, it is advanced in this position along the trough T until it is engaged by the lead portion 274a or 274b of the conveyor screw 236a. The action of both of these lead portions upon the fruit is the same and, therefore, only the action of the lead portion 274a is specifically described herein. If the fruit disposed in the trough, as shown at 508 in Fig. 2, arrives in this position at the lead portion 274a, the same sweeps from below against the bulb portion of the pear whereby the pear is suddenly lifted and kicked forward with accelerated speed along the trough T and out of engagement with the normal threads 270 at the trailing end of the pocket, as shown in dotted lines at 512 in Fig. 2. The component force of this sudden upward and forward kick causes the pear to swing laterally in clockwise direction from position 512 to the position as shown at 513 in Fig. 2 and to finally slide with its neck end downwardly on the tubular portion of the feed screw 236a into leading position in the trough and into contact with the center belt 296, as shown at 514 in Fig. 2.

If the pear is disposed and advanced in a position as shown at 508a in Fig. 3, the bulb portion thereof is engaged either by the lead portion 274c or 274d during the travel of the pear along the trough which both function in the same manner to turn the fruit with its stem end into leading position. For instance, if the bulb portion of the pear is engaged by the lead portion 274c, as shown in dotted lines at 516 in Fig. 2, the fruit is suddenly kicked upward and forward out of engagement with the normal thread portions 270 whereby the neck end of the pear is swung forward and the fruit is turned laterally in counterclockwise direction from position 516 to position 517 (Figs. 2 and 3) so that the neck end slides down the tubular portion of the feed screw 236b into leading position in the trough and into contact with the center belt 296, as shown at 518 in Figs. 2 and 3.

Should the lead portions 274 of the feed screws, however, fail to turn the pears in the manner as above described and a pear remain in a position with its stem blossom axis transversely disposed relative to the trough and with its neck lying on one or the other feed screw, as shown at 512 and 516 in Fig. 2, and be advanced in this position toward the continuously rotating star wheels 320, the rods 328 thereof will engage the neck end of such pears and kick the same forward into leading position in the trough.

During the operation of the machine water is sprayed from the overhead conduit 350 upon the advancing pears and the feed screws, which serves as a lubricant to reduce the friction between the pears and the feed screws to a minimum and to prevent tackiness of the feed screws due to fruit juices adhering to the same.

In the normal operation of the feed and orienting conveyor D, the majority of pears are oriented during their conveyance within the traveling pockets formed by the first five convolutions of the threads of the opposing feed screws whereupon the center belt 296, which travels at a greater speed than the pears, exerts a continuous forward drag upon the leading stem ends of the fruit and maintains the pears in oriented position while the thread portions 270 of adjacent feed screws engage the bulb ends of the fruit and convey the pears in properly timed and spaced relation with only one pear disposed in each traveling pocket 273 toward the discharge mechanism E.

As the pears arrive in succession at the discharge end of the trough T, the final convolution of the threads 270 transfers each individual pear onto the rounded block formations 263 in the hopper 260 and, due to the configuration of these block formations, the stem end of each fruit is tilted downward and the fruit is lowered into engagement with the center belt 296 which finally carries the fruit into the hopper 260 and deposits the fruit stem end down into the same (see Fig. 3).

Each pear so discharged into the hopper 260 gravitates stem end first into the closed pear positioning and centering pocket or feed trap 370 which receives the fruit and centers the same therein with the stem blossom axis of the fruit disposed in substantially vertical position for transfer into the feed cup (not shown) of the pear preparation machine.

In this manner the pears are continuously fed from the chute 195 to the discharge mechanism E and are oriented during their conveyance along the orienting conveyor D so that all pears are deposited in predetermined position, i. e., stem end down into the feed trap 370 and are discharged therefrom in said position either into the feed cup of a pear preparation machine of the type referred to herein or to the pear holding or transfer means of any other type of pear handling machine in connection with which the apparatus of the present invention may be used.

While I have shown and described a preferred embodiment of my invention, it will be understood that various changes and modifications may be made without departing from the spirit of the present invention. It is to be understood, therefore, that the scope of the invention should be limited only by the scope and proper interpretation of the claims appended hereto.

Having thus described my invention, what I claim as new and desire to protect by Letters Patent is:

1. A pear feed comprising oppositely convoluted screws arranged in spaced relation for supporting a pear between succeeding thread portions thereof, means for rotating the screws in opposite directions so as to advance the pear along said screws and to effect tumbling of the pear between the same until it is disposed with its stem end in leading position therebetween, a belt intermediate said screws for engaging the stem end of the pear, and means for moving said belt in the direction of travel of the pear but at a greater speed than the same for arresting the tumbling of the pear when its stem end is disposed in leading position and in engagement with said belt and for maintaining the pear in said position during the remainder of its travel along said screws.

2. A pear feed comprising twin screws arranged in spaced relation to form a trough for supporting pears, said twin screws having oppositely convoluted threads so disposed relative to each other as to form pockets therebetween, each of said pockets being adapted to receive one pear at one end of said trough for advancement along the same and for discharge therefrom at the opposite end thereof, the screws being spaced apart a distance sufficient to admit the stem end of a pear but not the bulb end thereof therebetween, said threads being provided with accelerated lead portions staggered along said trough, means for rotating the twin screws in opposite directions with the threads traveling upwardly in said trough to advance said pockets and the pears therein along the same and for turning the pears endwise by the action of the threads and accelerated lead portions thereon until they are disposed with their stem ends in leading position in said pockets, and means intermediate said screws for supporting the stem ends of the pears and for arresting the rolling and endwise turning of the pears when in said position.

3. A pear feed comprising twin screws arranged in spaced relation to form a trough for supporting pears on their bulb portions therebetween, said twin screws having helicoidal convolutions so disposed relative to each other as to form pockets in the trough therebetween, each of said pockets being adapted to receive one pear at one end of said trough for advancing it therealong and for discharging it therefrom at the opposite end thereof, accelerated helicoidal thread portions on said screws intermediate their convolutions and disposed in staggered relation with respect to each other, means for rotating the twin screws in opposite directions with the convolutions traveling upwardly in said trough whereby said pockets are advanced along said trough and the pears are rolled along the same under the action of the helicoidal convolutions thereon and are accelerated and swung sidewise during their advancement by upward and forward thrusts of one or the other of the accelerated lead portions against the bulb portion of the pears until the pears are disposed with their stem ends in leading position in said trough, and means for arresting further rotation and sidewise turning of the pears when they are disposed in said position.

4. A pear feed comprising twin screws arranged in spaced relation to form a trough for supporting pears on their bulb portions therebetween, said twin screws having oppositely convoluted normal threads so disposed relative to each other as to form pockets in the trough therebetween each of said pockets being adapted to receive one pear at one end of said trough for advancing it therealong and for discharging it therefrom at the opposite end of the trough, accelerated thread portions on said screws intermediate their normal threads and disposed in staggered relation with respect to each other along said screws, means for rotating the twin screws in opposite directions with the threads traveling upwardly in said trough whereby said pockets are advanced along said trough and the pears disposed therein are rolled along the same under the action of the normal threads thereon and are accelerated and turned sidewise under upward and forward thrusts of the accelerated thread portions against the bulb portion of the pears until the pears are disposed with their stem ends in leading position in said trough, a belt disposed parallel to and intermediate said screws at the bottom of said trough for engaging the stem ends of the pears, and means for moving said belt in the direction of travel of pears along said trough at a greater speed than the pears, whereby a forward drag is exerted against the stem portions of the pears when they are disposed in leading position in said trough in contact with said belt to prevent further rolling and sidewise turning of the pears.

5. A pear feed comprising twin screws substantially horizontally disposed in pear supporting relation and provided with oppositely convoluted helically trending normal threads forming a plurality of pockets therebetween for accommodating pears lengthwise therein and adapted to travel from one to the other end of said screws upon rotation thereof in opposite directions, accelerated helically trending threads disposed at predetermined points on each screw between the normal threads thereof, the accelerated thread portions being disposed in staggered relation with respect to each other, means for rotating said screws in opposite directions with the threads traveling upwardly therebetween for advancing a pear deposited into each pocket, whereby the pears are rolled along said screws by the action of said normal threads and are turned sidewise by the accelerated threads sweeping with an accelerated upward and forward thrust against the same until the pears are disposed with their stem ends in leading position between said screws, a belt intermediate said screws and extending parallel to the same for engaging the stem ends of the pears, and means for moving said belt in the direction of travel of the pears and at a different rate of travel for maintaining the pears with their stem ends in leading position.

6. An apparatus for feeding and orienting pears comprising substantially horizontally disposed parallel rotatable screws having a receiving and a discharge end and being spaced in pear supporting relation to form a trough therebetween, said screws being provided with spiral threads presenting a series of helicoidal surfaces inclined toward the receiving end of said rolls within said trough and forming pockets each of sufficient length to accommodate a pear lengthwise therein, means for rotating the screws in opposite directions so as to advance the pears from the receiving end toward the discharge end of said screws, said spiral threads being provided with accelerated portions disposed in staggered relation along said trough presenting helicoidal surfaces inclined toward the receiving end of the screws, whereby upon rotation of the screws pears deposited therebetween are rolled along said trough and are swung with their stem ends into leading position therein with one pear disposed in each pocket, a belt intermediate said screws for engaging the stem ends of the pears, and means for moving said belt in the direction of travel of the pears and at a greater speed than the same for maintaining the pears with their stem ends in leading position in said trough.

7. An apparatus for feeding and orienting pears comprising substantially horizontally disposed parallel rotating screws spaced from each other to form a trough having a receiving and a discharge end, said screws having oppositely convoluted spiral threads aligned transversely of the trough with respect to each other for moving pears from the receiving toward the discharge end of said trough upon rotation of the screws in opopsite directions and having thread portions of increased pitch disposed in staggered relation along said trough for accelerating the movement of pears intermediate the ends of said trough to swing the neck ends of the pears into leading position in the trough, and a certain belt moving parallel to and between said spaced screws at a greater speed than the pears for engaging the neck ends of the positioned pears and for maintaining them in leading position in said trough.

8. A pear feed comprising a conveyor including parallel rolls spaced to form a trough for supporting pears on their bulb portions therein, to tilt the stem ends thereof downwardly means for rotating the rolls in opposite directions, a spiral thread on each of said rolls, said threads being oppositely convoluted and so aligned with respect to each other transversely of the trough as to engage the bulb portions of the pears from below at transverse points to thereby urge the pears along said trough and to tumble them in cooperation with said rolls into a position with their stem portions in leading position in said trough, and differently moving conveyor means associated with said rolls for maintaining the pears in said position.

9. A pear aligner comprising oppositely convoluted twin screws arranged substantially horizontal in spaced relation to form a trough for supporting pears on their bulb portions therein, means for rotating the screws at equal speed in outward directions relative to said trough to advance the pears along the same and to induce rolling and sidewise turning of the pears until they are disposed with their stem ends in leading position in said trough, a star wheel rotatably mounted on each side of said trough and having pear engaging fingers adapted to engage the neck ends of pears remaining laterally disposed in said trough, and means for rotating said star wheels to turn pears engaged thereby sidewise in said trough to shift their neck portions into the same.

10. A pear aligner comprising oppositely convoluted twin screws arranged substantially horizontal in spaced relation to form a trough for supporting pears on their bulb portions therein, means for rotating the screws at the same speed in opposite directions to advance the pears along the same and to induce rolling and sidewise turning of the pears until they are disposed with their stem ends in leading position in said trough, a star wheel rotatably mounted on each side of said trough and having a plurality of pear engaging fingers adapted to engage the neck ends of pears remaining laterally disposed in said trough, and means for rotating the star wheels so as to cause said fingers to exert a sudden thrust against the neck portions of said pears in the direction of their travel along said trough whereby the pears are turned sidewise and their neck portions are swung into leading position in said trough.

11. An apparatus for feeding and orienting pears comprising parallel rolls spaced to support pears therebetween, helically trending oppositely convoluted threads on said rolls disposed to form pockets traveling from one end toward the other end of said rolls upon rotation thereof in opposite directions, means for rotating the rolls in opposite directions with the threads traveling upwardly between said rolls, whereby a pear deposited between the rolls is advanced along the same and is turned until it is disposed lengthwise in one of said pockets with its stem end in leading position therein, and a belt intermediate said rolls moving in the direction of travel of and at a different rate of travel from the pear and engaging the stem end of the pear for maintaining it in leading position.

12. An apparatus for feeding and orienting pears comprising parallel rolls spaced to support pears therebetween, helically trending oppositely convoluted raised threads on said rolls disposed to form pockets extending lengthwise of said rolls and adapted to support a pear in axially inclined position thereon, said pockets traveling from one end toward the other end of said rolls upon rotation thereof in opposite directions, said threads being provided with accelerated portions disposed in staggered relation on said rolls, and means for rotating the rolls in opposite directions with the threads traveling upwardly between said rolls, whereby a pear deposited between the rolls is advanced along the same and is accelerated and turned endwise in one of said pockets during its travel until it is disposed lengthwise in one of said pockets with its stem end in leading position therein.

13. An apparatus for feeding and orienting pears comprising substantially horizontal parallel rolls spaced to support the bulb ends of pears therebetween, helically trending oppositely convoluted raised threads on said rolls disposed to form pockets traveling from one end toward the other end of said rolls upon rotation thereof in opposite directions, said threads being provided with accelerated lead portions disposed in staggered relation at alternate stations along said rolls, means for rotating the rolls in opposite directions with the threads traveling upwardly between said rolls, whereby a pear deposited into each of said pockets at their initial point of travel is advanced along the rolls and is accelerated and turned endwise during its travel until it is disposed lengthwise in one of said pockets with its stem end in leading position therein, and means intermediate said rolls for engaging the stem ends of the positioned pears to maintain them in leading position during the remainder of the travel of the pears along said rolls.

14. An apparatus for feeding and orienting pears comprising parallel rolls spaced to support pears therebetween, helically trending oppositely convoluted threads on said rolls disposed to form pockets traveling from one end toward the other end of said rolls upon rotation thereof in opposite directions, accelerated lead portions associated with the threads of each roll forming partial convolutions therebetween, the lead portions of adjacent rolls being staggered with respect to each other, means for rotating the rolls in opposite directions with the threads traveling upwardly between said rolls, whereby a pear deposited between the rolls is advanced along the same and is temporarily accelerated and turned sidewise during its travel until it is disposed lengthwise in one of said pockets with its stem end in leading position therein, a belt intermediate said rolls for engaging the leading stem end of the pear, and means for moving said belt so as to exert a forward drag against the stem end of the pear to thereby maintain it in leading position.

15. An apparatus for feeding and orienting pears comprising parallel rolls spaced to support pears therebetween, helically trending oppositely convoluted threads on said rolls disposed to form pockets traveling from one end toward the other end of said rolls upon rotation thereof in opposite directions, accelerated lead portions associated with said threads and disposed intermediate the convolutions of the threads at predetermined positions on said rolls, means for rotating the rolls in opposite directions with the threads traveling upwardly between said rolls, whereby a pear deposited into each pocket at its initial point of travel is advanced along the rolls and is temporarily accelerated and turned until it is disposed lengthwise in one of said pockets with its stem end in leading position therein, and a belt intermediate said rolls moving in the direction of travel of and relative to the pears in said pockets for engaging the stem ends of the pears and for exerting a forward drag upon the same to thereby prevent further turning of the positioned pears and to maintain their stem ends in leading position during the remainder of their travel along said rolls.

16. An apparatus for feeding and orienting pears comprising parallel rolls disposed substantially horizontal in spaced relation to support pears on their bulb ends and with their stem ends depending in the valley formed therebetween, a helically trending thread on each of said rolls, said threads being oppositely convoluted and so disposed relative to each other as to form pockets each accommodating a pear lengthwise therein and traveling from one end toward the other end of said rolls in the valley therebetween upon rotation of said rolls in opposite directions, accelerated thread portions arranged in staggered relation on said rolls, means for rotating the rolls in opposite directions with the threads and accelerated thread portions traveling upwardly in said valley, whereby a pear deposited into one of said traveling pockets at its initial point of travel is advanced along said rolls by the forward and upward thrust exerted against the bulb portion of the pear by the threads at the trailing end of the pocket and is rolled and turned endwise by the combined action of the threads, accelerated thread portions and rolls thereon until the stem end of the pear is disposed in leading position in said valley, and stem end engaging means associated with said rolls for maintaining the pear with its stem end in leading position during further travel of the pear along said rolls.

17. An apparatus for feeding and orienting pears comprising parallel substantially horizontal cylindrical rolls spaced to support pears in the valley formed therebetween, a helically trending thread on each of said rolls, said threads being oppositely convoluted and so disposed relative to each other as to form pockets traveling from one end toward the other end of said rolls in the valley therebetween upon rotation of said rolls in opposite directions, means for rotating the rolls in opposite directions with the threads traveling upwardly in said valley, whereby a pear deposited into each pocket at one end of said rolls is advanced along the valley by the thread portions at the trailing end of its pocket and is rolled along and turned sidewise between said rolls under the combined action of the rolls and threads thereon until oriented with its stem end in leading position in said pocket, means associated with said rolls for turning pears remaining transversely disposed in their pockets into positions for orientation by the combined action of the rolls and threads thereon to dispose their stem ends in leading position in said pockets, movable means intermediate said rolls at the bottom of the pockets for engaging the stem end of the pears, and means for moving said movable means in the direction of travel of the pears along said valley and at a speed greater than that of the pears for exerting a forward drag on the stem end of oriented pears to prevent further rolling and turning thereof during their travel along said valley.

18. An apparatus for feeding and orienting pears comprising parallel rolls spaced to form a valley for supporting pears therein, helically trending threads on each of said rolls, the threads of adjacent rolls being oppositely convoluted and so disposed with respect to each other as to form pockets in said valley each of sufficient length to accommodate a pear lengthwise therein, accelerated thread portions on said rolls disposed in staggered relation along said valley, means for rotating the rolls in opposite directions with the threads traveling upwardly in said valley to effect advancement of said pockets from one toward the other end of said valley, a belt parallel to and intermediate said rolls at the bottom of said valley, and means for advancing said belt in the same direction as said pockets but at a greater speed than the same, whereby a pear deposited in the valley between said rolls is received within one of said pockets and is rolled and turned sidewise therein by the combined action of the threads, rolls and accelerated thread portions thereon until the stem end of the pear is disposed in leading position in contact with said belt and is maintained in said position by the forward drag of the belt against the same.

19. An apparatus for feeding and orienting pears comprising substantially horizontally disposed parallel rolls spaced to form a pear supporting trough having a receiving and a discharge end, helically trending oppositely convoluted threads on said rolls disposed to form pockets in said trough traveling from the receiving toward the discharge end thereof upon rotation of the rolls in opposite directions, each pocket being of sufficient length to accommodate a pear lengthwise therein, a belt intermediate said rolls and threads and forming a bottom for said trough, means for rotating the rolls in opposite directions with the threads traveling upwardly in said trough, whereby a pear deposited into each of said pockets at the receiving end of the trough is advanced toward the discharge end thereof and is rolled and turned sidewise until it is oriented with its stem end in leading position therein and in engagement with said belt, a star wheel on each side of said trough intermediate the receiving and discharge end thereof and having a plurality of fingers for engaging the stem ends of pears remaining transversely disposed in said trough, means for rotating said star wheels for exerting an accelerated forward thrust against the stem ends of said pears to swing them into leading position in said trough and into engagement with said belt, and means for moving said belt in the direction of travel of the pears at a speed exceeding the speed of travel of said pockets for maintaining the stem ends of oriented pears in leading position.

20. An apparatus for feeding and orienting pears comprising parallel rolls spaced to support pears on their bulb portion therebetween and having a fruit receiving and a fruit discharge end, a helically wound thread on each of said rolls, said threads being oppositely convoluted and so disposed in transverse alignment relative to each other as to form pockets between said rolls traveling from the receiving end of the rolls to the discharge end thereof upon rotation of the rolls in opposite directions, a belt intermediate said rolls for supporting the neck portion of the pears, means for rotating the rolls in opposite directions with their threads traveling upwardly in said pockets, whereby a pear haphazardly deposited between said rolls at the receiving end thereof is received within one of said pockets and advanced thereby toward the discharge end of the rolls, means associated with said rolls for effecting temporary accelerated advancement of the pear whereby it is oriented in conjunction with the action of the rolls and threads thereon with its neck end disposed in leading position upon said belt, and means for moving said belt in the direction of travel of the pears at a speed greater than that of the pear to thereby exert a forward drag on the leading neck end of the pear to thereby maintain the pear in oriented position.

21. An apparatus for feeding and orienting pears comprising substantially horizontal parallel rolls spaced to support pears on their bulb portions therebetween and forming a pear supporting trough having a pear receiving and discharge end, helically trending oppositely convoluted threads on said rolls disposed to form pockets in said trough traveling from the receiving end toward the discharge end thereof upon rotation of the rolls in opposite directions, each of said pockets being of sufficient length to accommodate a pear lengthwise therein, a belt intermediate said rolls and threads forming the bottom of said trough for supporting the stem ends of the pears, means for rotating the rolls in opposite directions with the threads traveling upwardly in said trough, each of said pockets being adapted to receive a pear dropped haphazardly therein at the receiving end of the trough for advancement of the pears in a single file and in spaced relation toward the discharge end thereof, whereby each pear is rolled and turned sidewise in its respective pocket by the combined action of the rolls and threads thereon until the stem end of the pear is disposed in leading position in said trough and in engagement with said belt, means for moving said belt in the direction of travel and relative to said pears for maintaining the pears with their stem ends in leading position, and means at the discharge end of the trough for receiving the pears stem end first.

22. An apparatus for feeding and orienting pears comprising substantially horizontal parallel rolls spaced to support pears on their bulb portions therebetween and forming a pear supporting trough having a pear receiving and a discharge end, helically trending oppositely convoluted threads on said rolls disposed to form pockets in said trough traveling from the receiving end toward the discharge end thereof upon rotation of the rolls in opposite directions, each of said pockets being of sufficient length to accommodate a pear lengthwise therein, a belt intermediate said rolls and threads forming a bottom for said trough for supporting the stem ends of the pears, means for rotating the rolls in opposite directions and with the threads traveling upwardly in said trough, each of said pockets being adapted to receive a pear dropped haphazardly therein at the receiving end of the trough for advancement of the pears in a single file and in spaced relation toward the discharge end thereof, means for exerting an accelerated forward and upward thrust alternately against opposite sides of the bulb portion of the pear during its travel along said trough in conjunction with the combined action of the rolls and threads thereon, whereby each pear is rolled forward and turned sidewise in said trough until its stem end is disposed in leading position in its respective pocket and in engagement with said belt, and means for moving said belt in the direction of travel and relative to said pears for maintaining the pears with their stem ends in leading position.

23. An apparatus for feeding and orienting pears comprising substantially horizontal parallel rolls spaced to support pears on their bulb portions therebetween and forming a pear supporting trough having a pear receiving and a discharge end, helically trending oppositely convoluted threads on said rolls disposed to form pockets in said trough traveling from the receiving end toward the discharge end thereof upon rotation of the rolls in opposite directions, each of said pockets being of sufficient length to accommodate a pear lengthwise therein, a belt intermediate said rolls and threads forming a bottom for said trough for supporting the stem ends of the pears, means for rotating the rolls in opposite directions and with the threads traveling upwardly in said trough, each of said pockets being adapted to receive a pear dropped haphazardly therein at the receiving end of the trough for advancement of the pears in a single file and in spaced relation toward the discharge end of said trough, means for exerting an accelerated forward and upward thrust alternately against opposite sides of the bulb portion of the pear during its travel along said trough in conjunction with the combined action of the rolls and threads thereon, whereby each pear is rolled forward and turned sidewise in said trough until its stem end is disposed in leading position in its respective pocket and in engagement with said belt, means for moving said belt in the direction of travel and relative to said pears for maintaining the same with their stem ends in leading position, means for receiving the pears stem end first at the discharge end of the trough and for orienting them stem end down with their stem blossom axes substantially vertical, and means for operating said receiving means for discharging the pears stem end down therefrom in timed relation with the travel of the pockets along said trough.

24. An apparatus for feeding and orienting pears comprising substantially horizontal parallel rolls spaced to form a trough having a pear receiving and discharge end, helically trending oppositely convoluted threads on said rolls disposed to form pockets in said trough traveling from the receiving end toward the discharge end thereof upon rotation of the rolls in opposite directions, each of said pockets being of sufficient length to accommodate a pear lengthwise therein, means associated with the rolls for effecting accelerated advancement of each pear at predetermined points of its travel along said trough, a belt intermediate said rolls and threads forming the bottom of said trough for supporting the stem ends of the pears, means for rotating the rolls in opposite directions with the threads traveling upwardly in said trough, each of said pockets being adapted to receive a pear dropped haphazardly therein at the receiving end of the trough for advancement of the pears in a single file and in spaced relation toward the discharge end thereof, whereby each pear is rolled and turned sidewise in its respective pocket during its travel along said trough until the stem end of the pear is disposed in leading position therein in engagement with said belt, means for moving said belt in the direction of travel of and relative to said pears for maintaining the pears with their stem ends in leading position, means at the discharge end of the trough for receiving the pears stem end first and for disposing them stem end down therein, and means for operating said receiving means for discharging the pears stem end down in timed intervals therefrom.

25. An apparatus for feeding and orienting pears comprising substantially horizontally disposed parallel rolls spaced to support pears on their bulb portions therebetween, a belt extending parallel to and intermediate said rolls for engaging the neck ends of the pears, said rolls and belt forming a trough having a pear receiving end and a pear discharge end, a helically trending oppositely convoluted thread on each of said rolls, the threads of adjacent rolls being so disposed relative to each other as to form pockets in said through traveling from the receiving toward the discharge end thereof upon rotation of the rolls in opposite directions, each of said pockets being of sufficient length to accommodate a pear lengthwise therein, means for rotating the rolls in opposite directions with the threads traveling upwardly in said trough, each of said pockets being adapted to receive a pear dropped haphazardly therein at the receiving end of the trough for advancement of the pears in a single file and in spaced relation toward the discharge end of the trough, accelerated thread portions on said rolls for exerting an upward and forward thrust alternately against opposite sides of the bulb portion of each pear at predetermined points of its travel along said trough, whereby each pear is rolled and turned around in its respective pocket by the combined action of the rolls, threads and accelerated thread portions thereon until it is positioned lengthwise with its neck end in leading position therein, and means for moving said belt in the direction of travel of the pears and at a greater speed than the same for preventing further rolling or turning of the positioned pear during the remainder of its travel toward the discharge end of the trough and subsequent discharge therefrom.

26. An apparatus for feeding and orienting pears comprising substantially horizontal parallel rolls spaced to support pears on their bulb portions therebetween and forming a pear supporting trough having a pear receiving and a discharge end, helically trending oppositely convoluted threads on said rolls disposed to form pockets in said trough traveling from the receiving end toward the discharge end thereof upon rotation of the rolls in opposite directions, each of said pockets being of sufficient length to accommodate a pear lengthwise therein, a belt intermediate said rolls and threads forming a bottom for said trough for supporting the stem ends of the pears, means for rotating the rolls in opposite directions and with the threads traveling upwardly in said trough, each of said pockets being adapted to receive a pear dropped haphazardly therein at the receiving end of the trough for advancement of the pears in a single file and in spaced relation toward the discharge end thereof, means for exerting an accelerated forward and upward thrust alternately against opposite sides of the bulb portion of the pear during its travel along said trough in conjunction with the combined action of the rolls and threads thereon, whereby each pear is rolled forward and turned sidewise in said trough until its stem end is disposed in leading position in its respective pocket and in engagement with said belt, a star wheel rotatably mounted on each side of said trough and having a plurality of pear engaging fingers adapted for engaging the neck end of a pear remaining laterally disposed in said trough, means for rotating the star wheels so as to cause said fingers to exert a sudden thrust against the neck portion of such laterally disposed pear in the direction of its travel along said trough to turn said pear sidewise with its neck portion into leading position in said trough, and means for moving said belt in the direction of travel and relative to said pears for maintaining the pears with their stem ends in leading position.

ALBERT R. THOMPSON.

REFERENCES CITED

The following references are of record in the file of this patent:

UNITED STATES PATENTS

| Number | Name | Date |
|---|---|---|
| 731,828 | White | June 23, 1903 |
| 1,750,327 | Olsen | Mar. 11, 1930 |
| 2,377,431 | Lakso | June 5, 1945 |
| 2,471,479 | Coons | May 31, 1949 |

FOREIGN PATENTS

| Number | Country | Date |
|---|---|---|
| 436,024 | Great Britain | Oct. 3, 1935 |